U S 0 0 7 2 0 9 5 7 4 B 2

US007209574B2

(12) United States Patent
Tafuku et al.

(10) Patent No.: US 7,209,574 B2
(45) Date of Patent: Apr. 24, 2007

(54) EYE TRACKING APPARATUS, EYE TRACKING METHOD, EYE STATE JUDGING APPARATUS, EYE STATE JUDGING METHOD AND COMPUTER MEMORY PRODUCT

(75) Inventors: Akiyoshi Tafuku, Oita (JP); Kozo Baba, Oita (JP); Hisao Ito, Oita (JP); Tomonobu Takashima, Kawasaki (JP); Tadao Omi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 431 days.

(21) Appl. No.: 10/763,209

(22) Filed: Jan. 26, 2004

(65) Prior Publication Data

US 2004/0179716 A1 Sep. 16, 2004

(30) Foreign Application Priority Data

Jan. 31, 2003 (JP) ............................. 2003-024288

(51) Int. Cl.
*G06K 9/00* (2006.01)
(52) U.S. Cl. ...................................... 382/103; 382/104
(58) Field of Classification Search ................ 382/103, 382/104
See application file for complete search history.

(56) References Cited

U.S. PATENT DOCUMENTS 5,410,376 A * 4/1995 Cornsweet et al. ......... 351/210

FOREIGN PATENT DOCUMENTS

| JP | 6-32154    | 2/1994  |
| JP | 10-236181  | 9/1998  |
| JP | 2000-163564 | 6/2000 |
| JP | 2000-301962 | 10/2000 |
| JP | 2001-43382 | 2/2001  |

* cited by examiner

*Primary Examiner*—Hung Xuan Dang
(74) *Attorney, Agent, or Firm*—Staas & Halsey LLP (57) ABSTRACT

Obtaining an image frame picked up by a camera 2 through a cable C, a CPU 10 of a computer 1 identifies an eye area in the image frame and stores a template indicating the identified area as a tracking template. Moreover, the CPU 10 identifies an eye area in an image frame to be obtained subsequently on the basis of the tracking template, and calculates a correlation value between the template of the identified area and the tracking template. Furthermore, when the calculated correlation value is larger than a threshold stored in an HD 11 in advance, the CPU 10 stores the template indicating the identified area in the RAM 12 as a tracking template, so as to update an eye area in a series of two image frames in chronological order.

17 Claims, 10 Drawing Sheets

MATRIX WITH THREE ROWS
AND THREE COLUMNS

| 1 | 1 | 1 |
|---|---|---|
| 0 | 0 | 0 |
| -1 | -1 | -1 |

EYE TRACKING APPARATUS, EYE TRACKING METHOD, EYE STATE JUDGING APPARATUS, EYE STATE JUDGING METHOD AND COMPUTER MEMORY PRODUCT

BACKGROUND OF THE INVENTION

1. Field of the Invention

The present invention relates to an apparatus and a method for detecting an eye in image data obtained in chronological order by picking up images of a face and tracking the detected eye, an apparatus and a method for judging the open/close state of the detected eye, and a computer memory product.

2. Description of Related Art

One of apparatuses to assist driving of a vehicle such as a car is an apparatus for picking up images of a driver's face with a vehicle-mounted camera positioned so as to pick up images of the driver's face, detecting the position of the driver's eye in the obtained image data and tracking the detected eye, which apparatus is suggested in Japanese Patent Application Laid-Open No. 2000-163564, for example.

Such an apparatus is generally constructed to store image data of an area including a detected eye of a driver when the eye included in image data are detected in image data obtained with the vehicle-mounted camera and comparing this image data with image data obtained sequentially while the vehicle is running, so as to detect an eye area in the image data obtained sequentially and, further, to perform an eye tracking process.

It is required in such a structure to sequentially store image data of an eye area detected in image data, which is to be used for detecting an eye in image data sequentially obtained in chronological order. Consequently, huge memory capacity will be required for storing the all image data of an eye area. Moreover, since areas which correlate closely with each other are selected from the respective image data obtained sequentially, a long time is required for a process of detecting an eye in subsequent image data.

Moreover, there is a problem that it is impossible to realize a process of tracking an eye in image data obtained sequentially when an area which does not include an eye is improperly detected as an eye area in the image data.

Another one of apparatuses to assist driving of a vehicle such as a car is an apparatus for converting image data obtained with the vehicle-mounted camera into binary data, detecting an eyeball area of a driver on the basis of the generated binary image data and judging the open/close state of the eye on the basis of the vertical width of the detected eyeball, which apparatus is suggested in Japanese Patent Application Laid-Open No. H6-32154 (1994), for example. Such an apparatus can detect the driver falling asleep at the wheel, so that it is also possible to construct a system to give warning to the driver asleep at the wheel.

Such an apparatus judges the open/close state of an eye by detecting the vertical width of an eye area in image data which has been converted into binary data. Consequently, there arises another problem that a difference in the vertical width of an eye between the open state and the closed state becomes small when the eyelashes are long or the eye is narrow, and it is difficult to judge the open/close state of the eye.

BRIEF SUMMARY OF THE INVENTION

The present invention has been made with the aim of solving the above problems, and it is an object thereof to provide an eye tracking apparatus, an eye tracking method and a computer memory product capable of realizing tracking of an eye on the basis of eye areas which resemble closely each other in a series of two image data in chronological order which are obtained by picking up images of a face.

Another object of the present invention is to provide an eye tracking apparatus capable of narrowing down the area for which an identification process of a second area is performed based on a tracking area, so as to shorten the time required for the identification process of the second area.

Another object of the present invention is to provide an eye tracking apparatus capable of sequentially updating an identified eye area in performing the eye tracking process.

Another object of the invention is to provide an eye tracking apparatus capable of identifying an area which may possibly include an eye as an eye area reliably, on the basis of a change between a series of two image data in chronological order.

Another object of the present invention is to provide an eye state judging apparatus, an eye state judging method and a computer memory product capable of judging the state of an eye with high accuracy irrespectively of the length of eyelashes, the narrowness of the eye and the like.

Still another object of the present invention is to provide an eye state judging apparatus capable of judging the shape of a lid and the open/close state of the eye easily on the basis of the coefficient part or the like of a calculated function which indicates the detected shape of the lid.

The eye tracking apparatus according to the present invention is an apparatus for detecting an eye in image data obtained in chronological order by picking up images of a face and tracking the detected eye, characterized by comprising: threshold storing means for storing a threshold; first identifying means for identifying a first area of an eye in the image data; tracking area storing means for storing the fist area identified by the first identifying means as a tracking area; second identifying means for identifying a second area of an eye in image data subsequent to the image data on the basis of the tracking area stored in the tracking area storing means; calculating means for calculating a correlation value indicating the strength of correlation between the tracking area and the second area; and comparing means for comparing the correlation value calculated by the calculating means with the threshold stored in the threshold storing means, wherein the tracking area storing means includes means for storing the second area identified by the second identifying means as a tracking area when a comparison result by the comparing means indicates that the correlation value is larger than the threshold.

The eye tracking method according to the present invention is a method for detecting, with a computer, an eye in image data obtained in chronological order by picking up images of a face and tracking the detected eye, characterized in that the computer stores a threshold, identifies a first area of an eye in the image data, stores the identified first area as a tracking area, identifies a second area of an eye in image data subsequent to the image data on the basis of the tracking area, calculates a correlation value between the tracking area and the second area, compares the calculated correlation value with the threshold, and stores the second area as a tracking area when a comparison result indicates that the correlation value is larger than the threshold.

The computer memory product according to the present invention is a computer memory product having a computer program for causing a computer to detect an eye in image data obtained in chronological order by picking up images of a face and to track the detected eye. The computer program is characterized by comprising: a process of causing the computer to store a threshold; a process of causing the computer to identify a first area of an eye in the image data; a process of causing the computer to store the identified first area as a tracking area; a process of causing the computer to identify a second area of an eye in image data subsequent to the image data on the basis of the tracking area; a process of causing the computer to calculate a correlation value between the tracking area and the second area; a process of causing the computer to compare the calculated correlation value with the threshold; and a process of causing the computer to store the second area as a tracking area when a comparison result indicates that the correlation value is larger than the threshold.

With the eye tracking apparatus, eye tracking method and computer memory product, a first area of an eye in image data obtained in chronological order by picking up images of a face is identified by first identifying means and the identified first area is stored in tracking area storing means as a tracking area. Moreover, a second area of an eye in image data subsequent to the image data is identified by second identifying means on the basis of the stored tracking area, a correlation value between the tracking area and the second area is calculated by calculating means, and the calculated correlation value and the threshold stored in advance is compared with each other by comparing means.

Furthermore, when a comparison result indicates that the correlation value is larger than the threshold, the identified eye area can be updated sequentially by storing the second area as a tracking area. Moreover, an eye tracking process can be performed reliably by updating the eye area when eye areas identified in a series of two image data in chronological order resemble each other.

In the eye tracking apparatus according to the present invention, the second identifying means may be constructed to identify a second area in a proximity area of the tracking area in the subsequent image data.

With this eye tracking apparatus, an area for which an identification process of a second area based on a tracking area is performed can be narrowed down and the time required for the identification process of the second area can be shortened by identifying the second area in a proximity area of the tracking area in image data subsequent to the image data in which the tracking area has been identified.

The eye tracking apparatus according to the present invention may comprise extracting means for extracting characteristic data of the tracking area and the second area, and the calculating means may be constructed to calculate a correlation value between the characteristic data of the tracking area extracted by the extracting means and the characteristic data of the second area extracted by the extracting means.

With this eye tracking apparatus, characteristic data of the tracking area and the second area are extracted by the extracting means, a correlation value between the extracted characteristic data of the tracking area and the second area is calculated by the calculating means, and the second area is stored as a tracking area when the result of comparison between the calculated correlation value and the threshold stored in advance indicates that the correlation value is larger than the threshold, so that an identified eye area can be updated sequentially and an eye tracking process can be performed.

By performing an eye tracking process based on characteristic data in the eye area as mentioned above, the memory capacity for data to be stored and used in each process is cut down, and the data amount to be processed in each process is reduced and the processing time is shortened.

The eye tracking apparatus according to the present invention may comprise change detecting means for detecting a change between the tracking area and the second area, and the tracking area storing means may be constructed to store the second area as a tracking area when the change detecting means detects a change.

With this eye tracking apparatus, a change between a tracking area identified in advance and a second area of an eye in image data subsequent to the image data in which the tracking area has been identified is detected by change detecting means and the second area is stored as a tracking area when the change is detected, so that an eye area can be identified reliably in an area which may possibly include an eye, on the basis of the change in a series of two image data in chronological order.

Consequently, when a tracking area identified in advance is an eyebrow area, this tracking area and a second area which is identified on the basis of the tracking area have approximately no change therebetween. It is therefore possible to identify such a tracking area not as an eye area but as an eyebrow area, and exclude this tracking area from the eye tracking process.

The eye state judging apparatus according to the present invention is an apparatus for detecting an eye in image data obtained by picking up an image of a face and judging the open/close state of the detected eye, characterized by comprising: identifying means for identifying an eye area in the image data; lid detecting means for detecting the shape of a lid in the eye area identified by the identifying means; and judging means for judging the open/close state of the eye on the basis of the shape of the lid detected by the lid detecting means.

The eye state judging method according to the present invention is a method for detecting, with a computer, an eye in image data obtained by picking up an image of a face and judging the open/close state of the detected eye, characterized in that the computer identifies an eye area in the image data, detects the shape of a lid in the identified eye area and judges the open/close state of the eye on the basis of the detected shape of the lid.

The computer memory product according to the present invention is a computer memory product having a computer program for causing a computer to detect an eye in image data obtained by picking up an image of a face and to judge the open/close state of the detected eye. The computer program is characterized by comprising: a process of causing the computer to identify an eye area in the image data; a process of causing the computer to detect the shape of a lid in the identified eye area; and a process of causing the computer to judge the open/close state of the eye on the basis of the detected shape of the lid.

With the eye state judging apparatus, eye state judging method and computer memory product, an eye area in image data obtained by picking up an image of a face is identified by identifying means, the shape of a lid in the identified eye area is detected by lid detecting means and the open/close state of the eye is judged by judging means on the basis of the detected shape of the lid, so that the eye state can be judged with high accuracy irrespectively of the length of eyelashes, the narrowness of the eye and the like.

In the eye state judging apparatus according to the present invention, the lid detecting means may include function calculating means for calculating a function which indicates the shape of the lid, and the judging means may judge the open/close state of the eye on the basis of the function calculated by the function calculating means.

With this eye state judging apparatus, a function which indicates the detected shape of the lid is calculated by function calculating means and the open/close state of the eye is judged by judging means on the basis of the calculated function, so that the shape of the lid and the open/close state of the eye can be judged easily on the basis of the coefficient part or the like of the calculated function.

The above and further objects and features of the invention will more fully be apparent from the following detailed description with accompanying drawings.

DETAILED DESCRIPTION OF THE INVENTION

The following description will explain the eye tracking apparatus and the eye state judging apparatus according to the present invention concretely with reference to the drawings illustrating an embodiment thereof.

Figure 1:
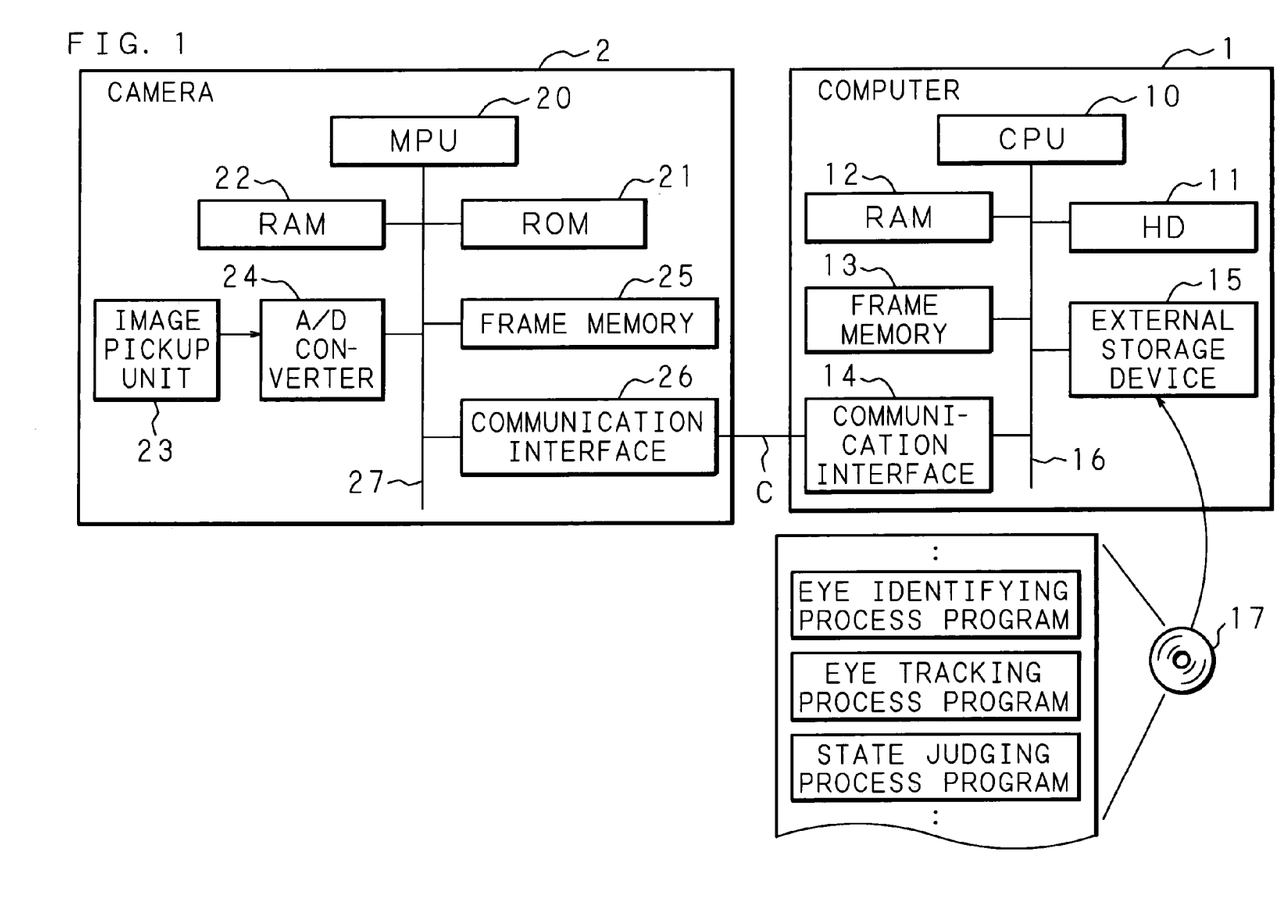
FIG. 1 is a block diagram showing an example of the configuration of the eye tracking apparatus and the eye state judging apparatus according to the present invention.

FIG. 1 is a block diagram showing an example of the configuration of the eye tracking apparatus and the eye state judging apparatus according to the present invention. The reference numeral 1 in the figure denotes a computer which operates as an eye tracking apparatus and an eye state judging apparatus according to the present invention, and this computer 1 is connected with a camera 2 via a cable C. It should be noted that the camera 2 and the computer 1 may be connected via a network such as a vehicle-mounted LAN (Local Area Network), instead of the exclusive cable C.

In this embodiment, the computer 1 is, for example, constructed to perform a process of tracking an eye of a driver who drives a vehicle such as a car and a process of judging the open/close state of the eye on the basis of an image picked up with the camera 2 positioned so as to pick up images of the face of the driver. The camera 2 can be mounted in proximity to a position where a mirror or a steering wheel is mounted, and obtains thirty image frames (image data) per second, for example.

It should be noted that the image frames to be processed by the eye tracking apparatus and the eye state judging apparatus of the present invention are not limited to image frames obtained by picking up images of a driver of a vehicle. Moreover, the position where the camera 2 is mounted is not limited to the proximity to the mirror or the steering wheel.

The camera 2 uses an MPU (Micro Processor Unit) 20 as a main controller to control operations of the following respective hardware parts connected with the MPU 20 via a bus 27.

Connected to the bus 27 are: a ROM 21 storing a computer program or the like which indicates the control procedure of the MPU 20; a RAM 22 for temporarily storing various data which are generated in control operations of the MPU 20; an image pickup unit 23 constituted of a CCD (Charge Couple Device) and the like; an A/D (Analog/Digital) converter 24 for converting analog image frames obtained by the image pickup unit 23 into digital image frames; a frame memory 25, which is constituted of a RAM and the like, for temporarily storing digital image frames which are converted by the A/D converter 24; a communication interface 26 to be used for data transmission via the cable C; and the like.

The MPU 20 controls the respective hardware parts mentioned above via the bus 27 while timing a predetermined time with timing means (not illustrated in the figure) provided therein, and sequentially executes various computer programs, which are stored in the ROM 21, necessary for operations of the camera 2.

The A/D converter 24 in this embodiment converts analog image frames which are sequentially inputted from the image pickup unit 23 into digital image frames in which each pixel is indicated with 256 scales (1 Byte), for example.

The camera 2 constructed as explained above captures image frames in predetermined timing with the image pickup unit 23. The captured image frames are converted into digital image frames by the A/D converter 24, stored temporarily in the frame memory 25 and then inputted into the computer 1 via the communication interface 26.

The computer 1 comprises: a CPU (Central Processing Unit) 10 which operates as a main controller; a hard disk (which will be referred to as HD hereinafter) 11 for storing a computer program or the like which indicates the control procedure of the CPU 10; a RAM 12 for temporarily storing various data which are generated in control operations of the CPU 10; a frame memory 13, which is constituted of a RAM and the like, for temporarily storing image frames obtained via the cable C; a communication interface 14 to be used for data transmission via the cable C; an external storage device 15 such as a CD-ROM drive; and the like.

The CPU 10 comprises timing means (not illustrated in the figure) so as to control the respective hardware parts mentioned above via the bus 16 and sequentially execute a computer program stored in the HD 11 while timing a predetermined time.

As an eye tracking apparatus and an eye state judging apparatus of the present invention, the computer 1 reads at the external storage device 15 an eye identifying process program, eye tracking process program, eye state judging process program and the like which are stored in a computer memory product 17 such as a CD-ROM to be used by the computer 1. The read computer program is stored in the HD 11. The HD 11 also stores a threshold and the like to be used in each process and operates as threshold storing means.

As the eye tracking apparatus and the eye state judging apparatus of the present invention, such a computer 1 causes the CPU 10 to read a computer program stored in the HD 11 out to the RAM 12 and to execute the computer program sequentially, so as to execute each process which the computer 1 requires, to identify a driver's eye area included in an image frame obtained with the camera 2 via the cable C, to track the identified eye and to judge the open/close state of the identified eye.

The computer 1 constructed as explained above causes the CPU 10 to read an eye tracking process program stored in the HD 11 out to the RAM 12 and to execute the eye tracking process program sequentially, so as to perform a process of tracking a driver's eye included in image frames obtained with the camera 2.

This eye tracking process is a process of tracking an eye area in image frames obtained sequentially on the basis of an eye area detected in advance when an eye area has already been detected in an image frame obtained with the camera 2. The eye area in image frames can be tracked more efficiently by using an initial template and a tracking template registered in the RAM (tracking area storing means) 12 in an eye position identifying process of the computer 1, which process will be explained later.

Here, the template means characteristic data which indicates an eye area in an image frame. The initial template means characteristic data of an eye area which is detected first in an image frame obtained with the camera 2. The tracking template means characteristic data which indicates characteristic data which indicates an eye area in an image frame which has been identified in an eye tracking process.

The initial template is updated in an eye position identifying process, which will be explained later, so as to indicate characteristic data in an area of an eye which is open after blinking.

Figure 2:
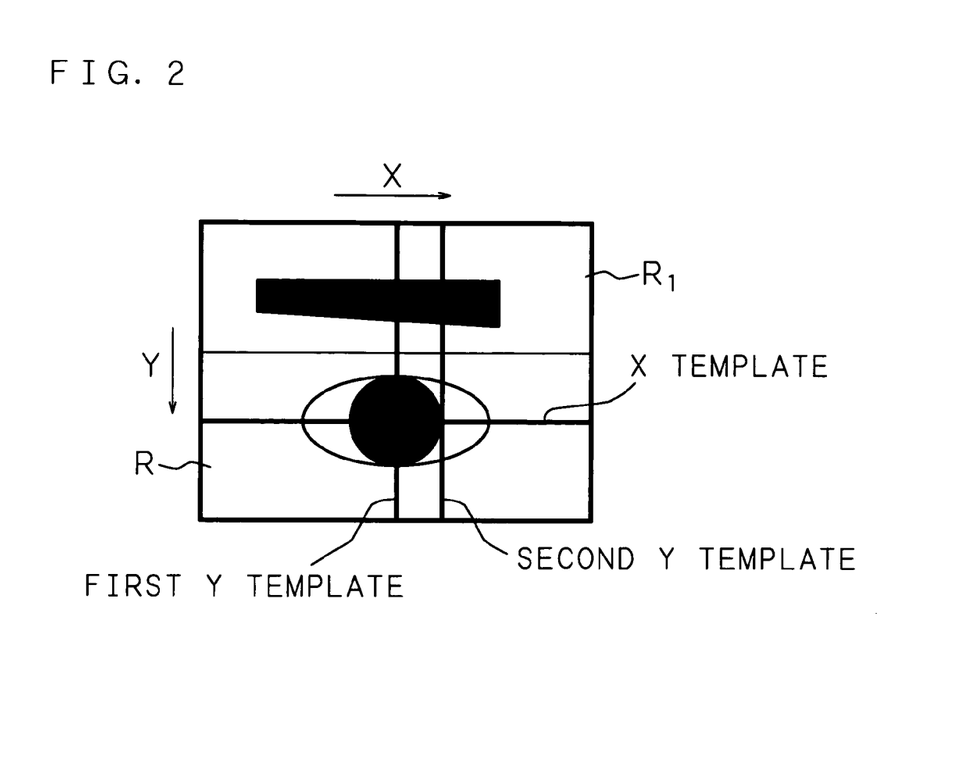
FIG. 2 is a view for explaining a template.

FIG. 2 is a view for explaining a template. A template in this embodiment includes an X template of a rod-shaped area extending in a horizontal direction denoted by "X" in the figure and a first Y template and a second Y template of two rod-shaped areas extending in a vertical direction denoted by "Y" in the figure in an area $R_1$ including an eyebrow part based on an eye area R detected by an image frame. An eye area is identified with these templates.

It should be noted that, although the template is not limited to the three rod-shaped areas illustrated in the figure, it is possible to identify an eye precisely with a small number of templates by setting templates so as to include an eyebrow area and a pupil area.

Figure 3:
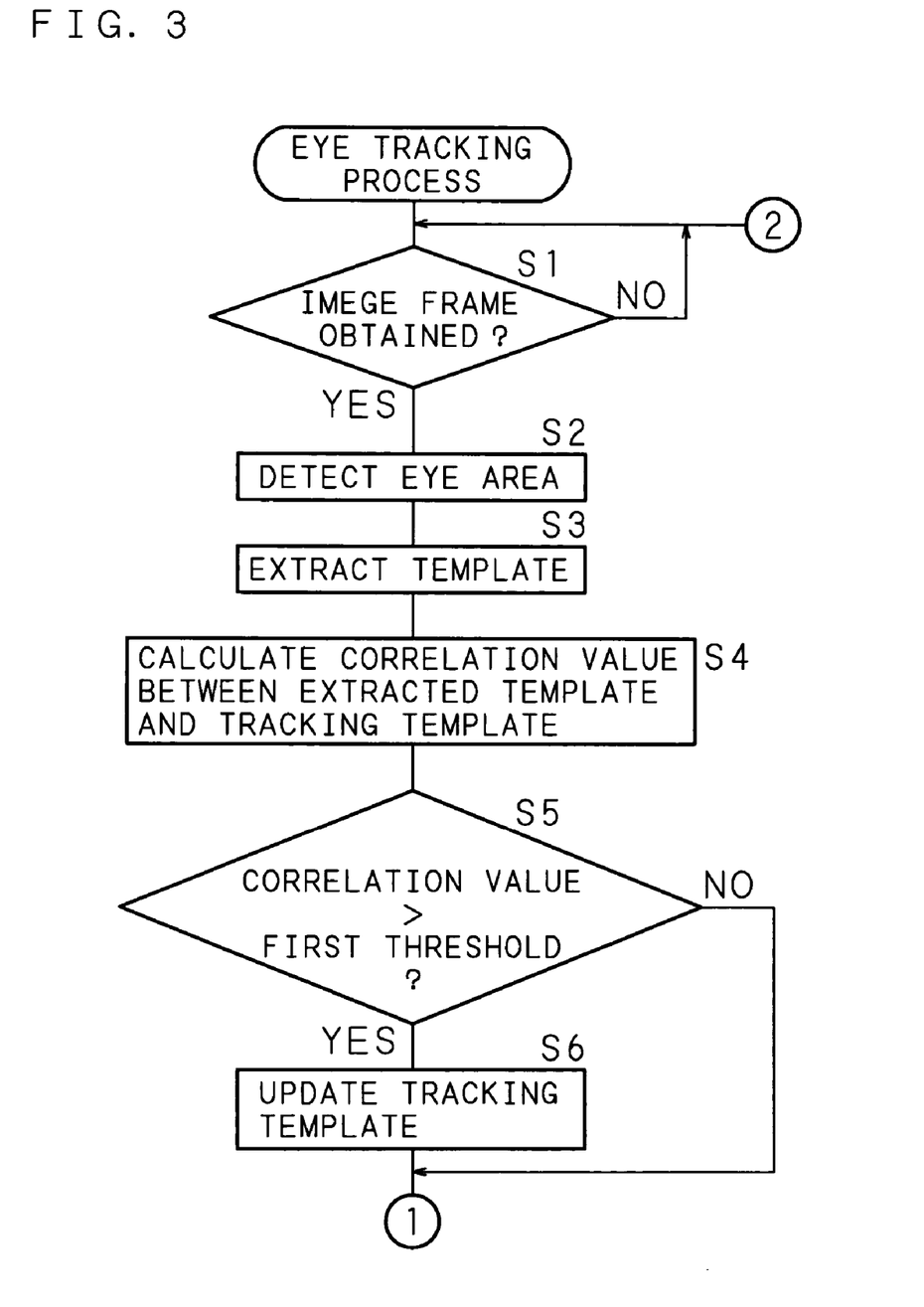
FIGS. 3 and 4 are flow charts showing a procedure of the eye tracking process by a computer.
Figure 4:
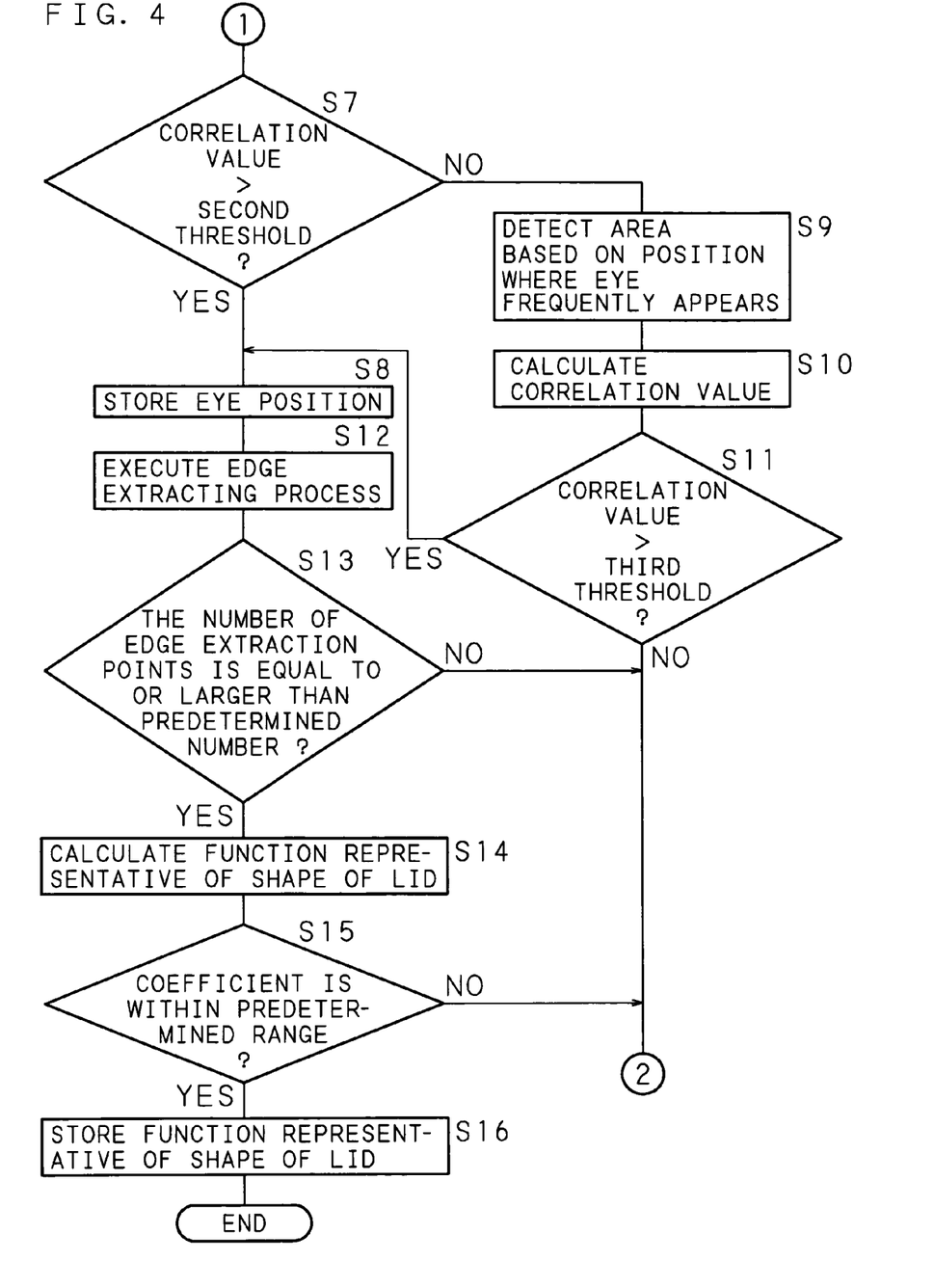

FIGS. 3 and 4 are flow charts showing a procedure of the eye tracking process by the computer 1. The CPU 10 judges whether an image frame has been obtained with the camera 2 or not (step S1). When no image frame has been obtained (NO in step S1), the CPU 10 waits. When an image frame has been obtained (YES in step S1), the CPU 10 detects an eye area in the image frame obtained with the camera 2 on the basis of a tracking template which has been registered in the RAM 12 in advance (step S2).

The CPU 10 operates as extracting means for extracting a template as characteristic data of the detected eye area, to extract a template of the eye area (step S3).

The CPU 10 operates as calculating means for calculating a correlation value between the extracted template and a tracking template registered in the RAM 12, to calculate the correlation value (step S4) using, for example, the following equation:

$$\text{Correlation Value} = [1/N\{\Sigma(Pi-Pa)\times(Ti-Ta)\}]/(Ps\times Ts),$$

wherein N indicates the number of pixels; Pi indicates the current pixel data (luminance); Ti indicates the template pixel data (luminance); Pa indicates the luminance average of P, Ta indicates the luminance average of T, Ps indicates the standard deviation of the luminance of P, and Ts indicates the standard deviation of the luminance of T.

The CPU 10 operates as comparing means for comparing the correlation value calculated as explained above with a first threshold stored in the HD 11 in advance, to judge whether the correlation value is larger than the first threshold or not (step S5). When it is judged that the correlation value is larger than the first threshold (YES in step S5), the CPU 10 updates the tracking template of the RAM 12 with the template extracted in step S3 (step S6).

On the other hand, when it is judged that the correlation value is smaller than the first threshold (NO in step S5), the CPU 10 does not perform the process in step S6 but judges whether or not the correlation value is larger than a second threshold which has been stored in the HD 11 in advance (step S7).

Here, in the process in step S5, it is judged whether or not the area detected in step S2 can be utilized as a tracking template to be used in the eye tracking process. For example, even when the area cannot be utilized as a tracking template, an eye may possibly be detected in this area. Consequently, it is judged in the process in step S7 whether an eye can be detected in this area or not.

Consequently, when the correlation value is larger than the second threshold (YES in step S7), the CPU 10 judges that an eye can be detected in this area and stores the center position of the eye indicating this area in the RAM 12 (step S8).

On the other hand, when the correlation value is smaller than the second threshold (NO in step S7), i.e. when no eye could be detected in the area, the CPU 10 detects a new eye area in the image frame where an eye has appeared frequently in processes performed previously (step S9) and calculates the correlation value between the template of the detected area and the initial template which has been stored in the RAM 12 in advance (step S10) in a similar manner to the process in step S4.

The CPU 10 judges whether the calculated correlation value is larger than a third threshold which has been stored in the HD 11 in advance or not (step S11). When the correlation value is larger than the third threshold (YES in step S11), it is judged that an eye can be detected in the area detected in step S9 and the center position of the eye indicating this area is stored (step S8).

On the other hand, when the correlation value is smaller than the third threshold (NO in step S11), i.e. when no eye to be tracked could be detected in the area, the process goes back to step S1 to perform an eye tracking process for the next image frame.

The CPU 10 then executes an edge extracting process by functioning as lid detecting means for detecting the shape of an upper lid in the eye area on the basis of the eye position stored in step S8 (step S12).

Figure 5A:
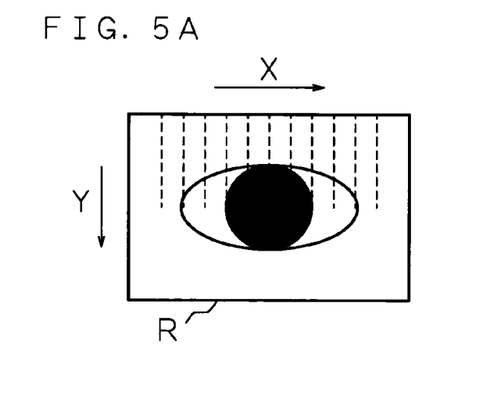
FIGS. 5A through 5F are views for explaining an edge extracting process.

FIGS. 5A through 5F are views for explaining the edge extracting process, and FIG. 5A shows an eye area R detected in step S2 or S9. Image data of this area R includes pixel data which are arranged respectively in the horizontal direction X and the vertical direction Y.

Figure 5B:
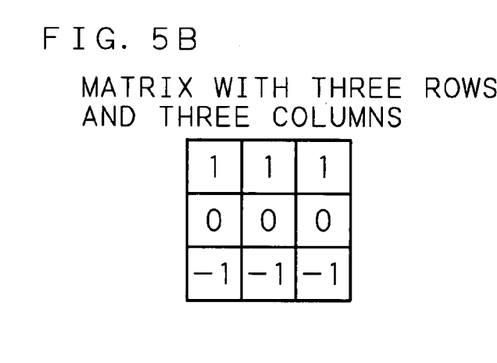

In the edge extracting process, a filtering process using a matrix with three rows and three columns as shown in FIG. 5B, for example, is performed while scanning each pixel data in the vertical direction as shown with the broken line in FIG. 5A. By performing the filtering process using such a matrix, an edge between high-luminance area and low-luminance area is emphasized.

The CPU 10 extracts the position of pixel data, which has the highest luminance in the vertical direction higher than a predetermined luminance set in the HD 11 in advance as a threshold, as an edge extraction point from the respective image data after filtering process.

Figure 5C:
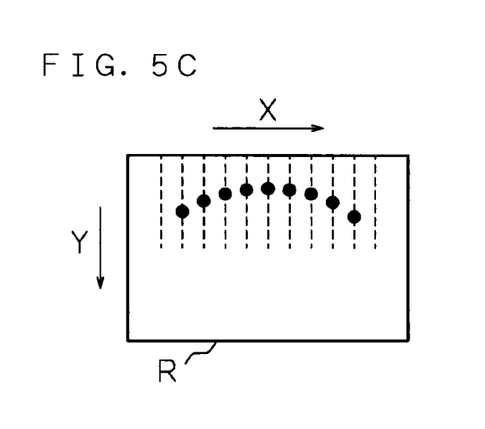

FIG. 5C is a view showing the position of the edge extraction point extracted as explained above. The CPU 10 counts the number of the edge extraction points extracted as explained above and judges whether or not the counted number is equal to or larger than a predetermined number stored in the HD 11 in advance (step S13).

When the number of the edge extraction points is smaller than the predetermined number (NO in step S13), it is judged that the eye area does not include an eye and the process goes back to step S1 to perform an eye tracking process for the next image frame.

On the other hand, when it is judged in step S13 that the number of the extracted edge extraction points is equal to or larger than the predetermined number (YES in step S13), it is supposed that these edge extraction points indicate an upper lid. In this case, the CPU 10 operates as function calculating means for calculating a function representative of the shape of the upper lid using approximation of the relative positions on the basis of the positions of the respective edge extraction points shown in FIG. 5C, to calculate the function (step S14).

Figure 5D:
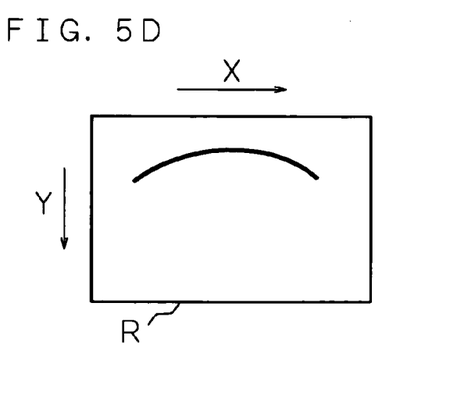

As shown in FIG. 5D, an upper lid can be represented with, for example, a quadratic function in approximation. The function to be calculated here is also a quadratic function.

Figures 5E, 5F:
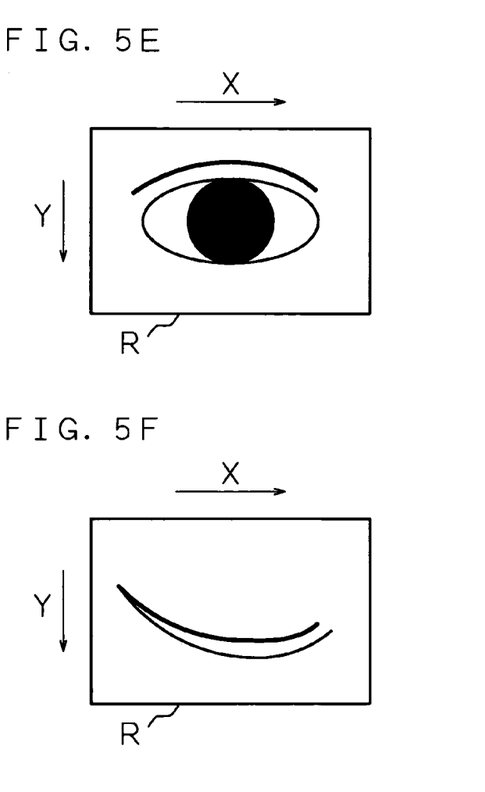

Here, the upper lid may possibly change from a state where the eye is open as shown in FIG. 5E to a state where the eye is closed as shown in FIG. 5F, and the coefficient of the quadratic function representative of the upper lid as mentioned above varies within a predetermined range.

Consequently, the CPU 10 judges whether the coefficient of the calculated quadratic function is within a predetermined range or not (step S15). When it is judged that the coefficient is within a predetermined range (YES in step S15), the calculated function representative of the shape of the lid is stored (step S16).

On the other hand, when the coefficient of the calculated quadratic function is not within the predetermined range (NO in step S15), it is judged that the eye area does not include an eye and the process goes back to step S1 to perform an eye tracking process for the next image frame.

Figure 6:
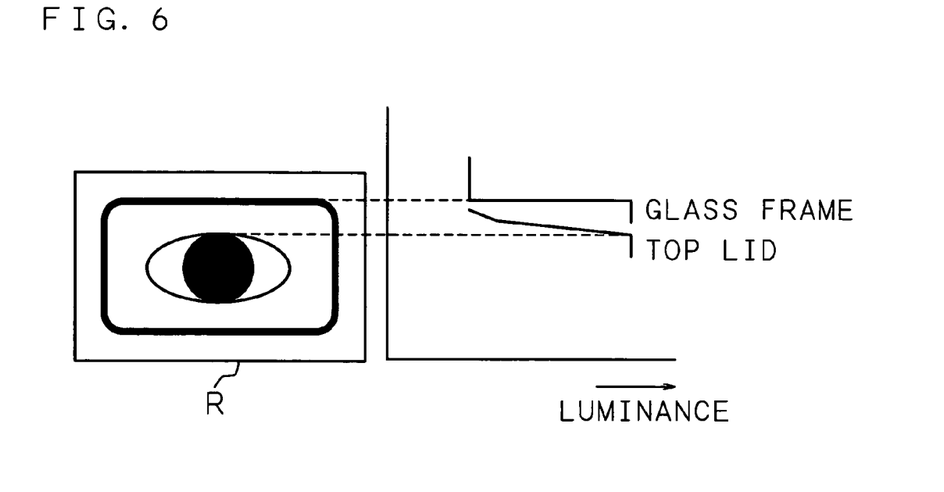
FIG. 6 is a view illustrating an image frame including a glasses frame.

FIG. 6 is a view illustrating an image frame including a glasses frame. As described above, in a case where the upper lid is extracted by the edge extracting process from the detected eye area, the edge of the glasses frame in the image frame shown in FIG. 6 is overemphasized after a filtering process. As a result, as shown in the figure, it is possible to judge easily the difference between the glasses frame and the upper lid.

Consequently, it is possible to detect the shape of the upper lid reliably even in an image frame including the glasses frame without mistaking the glasses frame for the upper lid.

The following description will explain a process of identifying the eye position of a driver of a vehicle, for example, in an image frame obtained with the camera 2, by reading the eye identifying process program stored in the HD 11 out to the RAM 12 and sequentially executing the eye identifying process program with the CPU 10.

Figure 7:
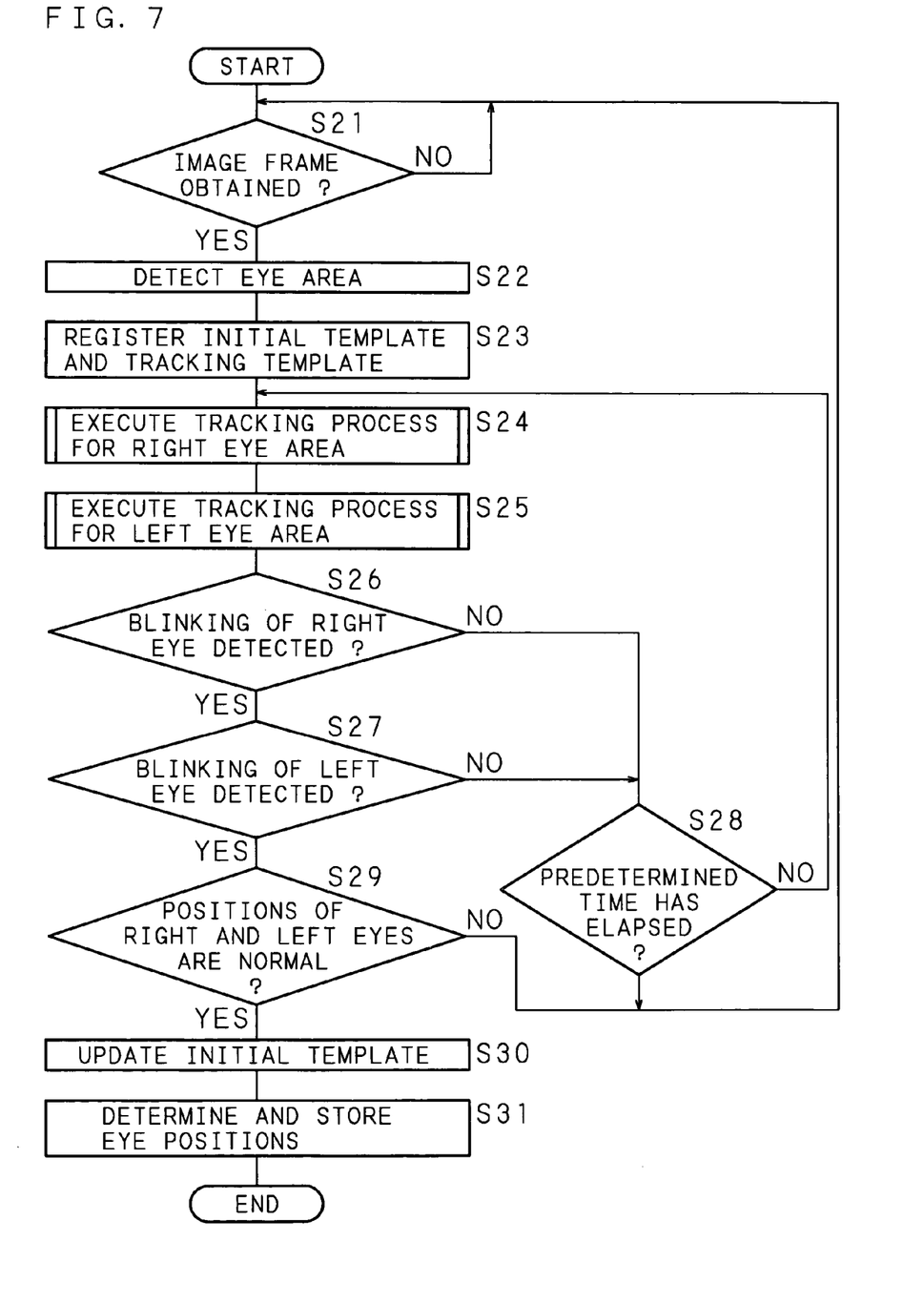
FIG. 7 is a flow chart showing the procedure of the eye position identifying process by a computer.

FIG. 7 is a flow chart showing the procedure of the eye position identifying process by the computer 1. The CPU 10 judges whether an image frame has been obtained with the camera 2 or not (step S21). When no image frame has been obtained (NO in step S21), the CPU 10 waits. When an image frame has been obtained (YES in step S21), the CPU 10 detects an eye area, which may possibly include the right and left eyes, in the obtained image frame (step S22).

It should be noted that the eye area can be detected by a conventionally-known detecting method using a binarizing process, for example. Concretely, the obtained image frame is binarized and an area where pixels having image data of "1" gather is detected in the obtained image frame and this area is identified as an area which may highly possibly include a pupil.

Moreover, the eye area to be detected is an area which may possibly include an eye. Consequently, when a plurality of areas are detected, the following respective processes will be performed sequentially for each area.

The CPU 10 extracts a template as characteristic data of each area from the eye area detected in step S22, and registers the extracted template in the RAM 12 as the initial template and the tracking template, together with the center position of the detected area (step S23).

The CPU 10 then executes the tracking process mentioned above, first for the right eye area of the detected right and left eye areas (step S24), and then executes the tracking process for the left eye area (step S25).

The CPU 10 tries to detect blinking of the right eye by the tracking process in step S24 and judges whether blinking of the right eye has been detected or not (step S26).

Concretely, the CPU 10 operates as change detecting means for detecting a change in the coefficient of the function stored in step S16 of the tracking process explained with reference to FIGS. 3 and 4. For example, the CPU 10 can judge that an eye shifts from a closed state through an open state to a closed state when the coefficient changes from a small value through a large value to a small value, and can judge that an eye shifts from an open state through a closed state to an open state when the coefficient changes from a large value through a small value to a large value.

When blinking of the right eye is detected (YES in step S26) in the abovementioned judgment method, the CPU 10 tries to detect blinking of the left eye on the basis of the tracking process in step S25 to judge whether blinking of the left eye has been detected or not, in the same manner (step S27).

Here, when blinking of the right eye cannot be detected in step S26 (NO in step S26), or when blinking of the left eye cannot be detected in step S27 (NO in step S27), the CPU 10 judges whether a predetermined time has elapsed or not with timing means provided therein (step S28), and executes the processes from step S24 to step S27 repeatedly until a predetermined time has elapsed (NO in step S28). When a predetermined time has elapsed (YES in step S28), i.e. when a predetermined time has elapsed before blinking of the right eye or blinking of the left eye is detected, it can be judged that the eye area detected in step S22 does not include eyes and the process goes back to step S21 to execute processes for the image frame to be obtained next.

When the CPU 10 has detected blinking of the left eye in the step S27 (YES in step S27), it is judged whether the positions of the right and left eyes are normal or not (step S29) by comparing the areas of the eyes in which blinking is respectively detected.

Figure 8:
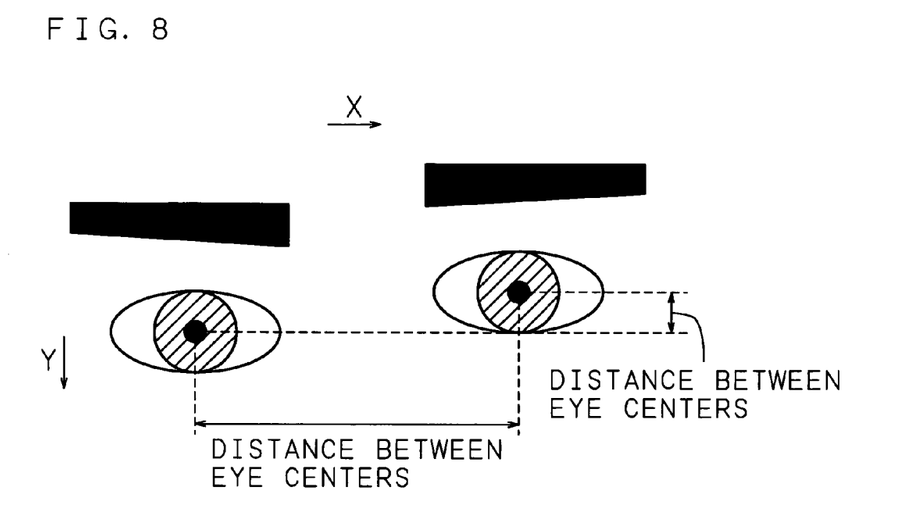
FIG. 8 is a view for explaining the positional relation between the right and left eyes.

FIG. 8 is a view for explaining the positional relation between the right and left eyes. It is judged whether the positions of the right and left eyes are normal or not on the basis of the distance in the horizontal direction and the distance in the vertical direction between the center position of the right eye area and the center position of the left eye area.

Concretely, the distance in the horizontal direction X or the distance in the vertical direction Y between the center position of the right eye area and the center position of the left eye area is compared with a distance stored in the HD 11 in advance. When the distance is clearly too long or too short, it can be judged that the eye area detected in step S22 does not include eyes. When it is judged that the positions of the right and left eyes are not normal (NO in step S29), the CPU 10 goes back to the process in step S21 to execute processes for the image frame to be obtained next.

On the other hand, when it is judged that the positions of the right and left eyes are normal (YES in step S29), the CPU 10 updates the initial template stored in the RAM 12 with the template indicating these eye areas (step S30) for the use in the subsequent eye tracking processes.

The CPU 10 determines that the center position of the eye area is the center position of the eye and stores the center position in the RAM 12 (step S31), and the eye position identifying process ends.

The following description will explain a process of identifying the open/close state of the eye of the driver of a vehicle on the basis of the image frame obtained with the camera 2, by reading a state judging process program stored in the HD 11 out to the RAM 12 and sequentially executing the program by the CPU 10 of the computer 1 which performs the eye tracking process and the eye identifying process as described above. The CPU 10 executes the state judging process program to judge the open/close state of the driver's eyes only when the abovementioned eye tracking process and eye identifying process have been executed.

Figure 9:
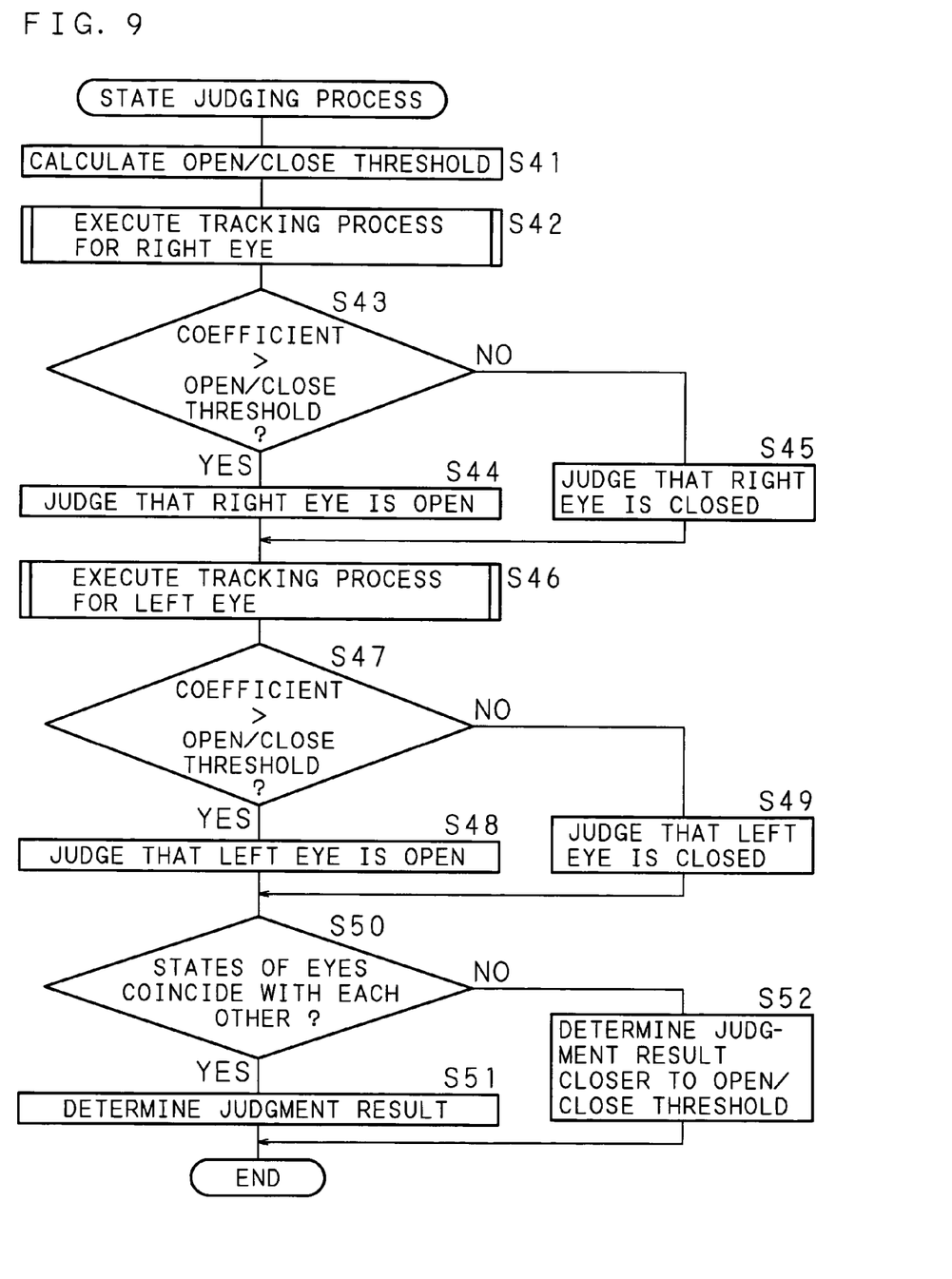
FIG. 9 is a flow chart showing a procedure of the eye state judging process by a computer.

FIG. 9 is a flow chart showing the procedure of the eye state judging process by the computer 1. The CPU 10 calculates an open/close threshold for judging the open/close state of the driver's eyes, on the basis of the function representative of the upper lid which has been calculated in the eye tracking process described above (step S41).

Figure 10:
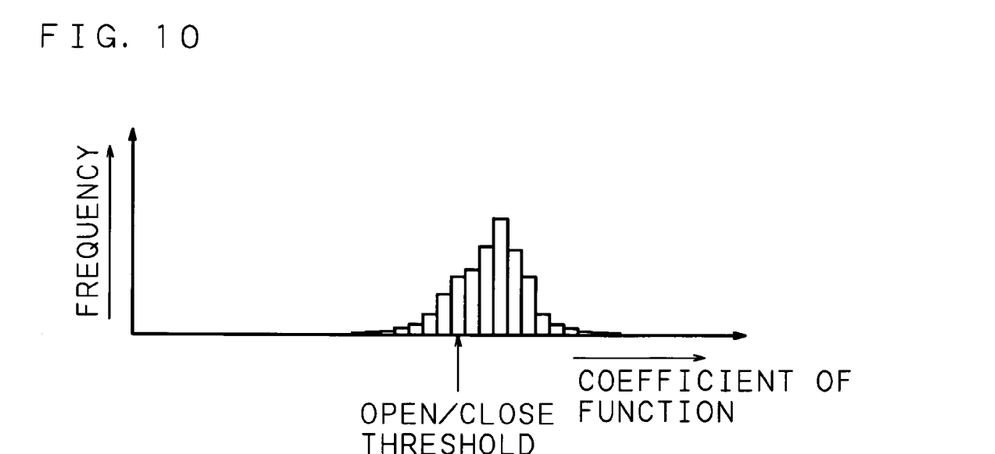
FIG. 10 is a view for explaining the process of calculating the open/close threshold.

FIG. 10 is a view for explaining the process of calculating the open/close threshold. The horizontal axis indicates the coefficient of the calculated quadratic function representative of the upper lid and the vertical axis indicates appearance frequency of the each coefficient. A predetermined coefficient value as shown on the horizontal axis is decided as an open/close threshold.

On the basis of the image frames obtained sequentially, the CPU 10 executes the abovementioned tracking process for the driver's right eye in the images frames (step S42) to calculate a function representative of the shape of the upper lid of the right eye. Moreover, on the basis of the calculated quadratic function, the CPU 10 operates as judging means for judging the open/close state of the right eye, to judge whether or not the coefficient of the calculated quadratic function is larger than the open/close threshold calculated as described above (step S43).

When the coefficient is larger than the open/close threshold (YES in step S43), the CPU 10 judges that the right eye is open (step S44). When the coefficient is smaller than the open/close threshold (NO in step S43), the CPU 10 judges that the right eye is closed (step S45).

The CPU 10 then executes the abovementioned tracking process for the driver's left eye in the image frames (step S46) to calculate a function representative of the shape of the upper lid of the left eye and judges whether or not the coefficient of the calculated quadratic function is larger than the open/close threshold calculated as described (step S47).

When the coefficient is larger than the open/close threshold (YES in step S47), the CPU 10 judges that the left eye is open (step S48). When the coefficient is smaller than the open/close threshold (NO in step S47), the CPU 10 judges that the left eye is closed (step S49).

The CPU 10 judges whether the open/close state of the right eye and the open/close state of the left eye judged as mentioned above coincide with each other or not (step S50). When they coincide (YES in step S50), the abovementioned judgment result is determined (step S51). When they do not coincide (NO in step S50), determined as the open/close state of the driver's eyes is the open/close state of an eye, the coefficient of the calculated function representative of the shape of the upper lid of which is closer to the open/close threshold (step S52).

Since the right and left eyes tend to blink simultaneously, the open/close state of the eyes can be decided precisely by judging the open/close state of the eyes comprehensively as described above on the basis of the judged state of the right and left eyes.

The abovementioned computer 1 may also be constructed to detect the open/close state of the eyes of a driver driving a vehicle and warn the driver of falling asleep at the wheel by judging that the driver has fallen asleep when the close state has continued for a predetermined period of time. Moreover, the eye tracking process and the eye state judging process according to the present invention can be applied not only to a driver of a vehicle but to various image frames of a face picked up.

It should be noted that, although the computer 1 in the above embodiment stores a computer program for performing various operations in the HD 11 and realizes the respective operations by executing this program with the CPU 10, it is also possible to construct the respective operations with hardware.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An eye tracking apparatus for detecting an eye in a plurality of pieces of image data, which are obtained in chronological order by picking up images of a face, and tracking the detected eye, comprising:
a threshold storing unit for storing a threshold;
a tracking area storing unit for storing a tracking area; and
a controller, capable of performing operations of
identifying a first area of an eye in a piece of image data;
causing the tracking area storing unit to store the identified first area as the tracking area;
identifying a second area of an eye in one of the pieces of image data subsequent to another of the pieces of image data obtained in chronological order, on the basis of the tracking area stored in the tracking area storing unit;
calculating a correlation value between the tracking area and the second area; and
comparing the calculated correlation value with the threshold stored in the threshold storing unit;

wherein the tracking area storing unit stores the second area identified by the controller as the tracking area when a comparison result by the computer indicates that the correlation value is larger than the threshold.

2. The eye tracking apparatus according to claim 1, wherein the controller identifies the second area, which is near the tracking area, in the one of the pieces of image data subsequent to the another of the pieces of image data obtained in chronological order.

3. The eye tracking apparatus according to claim 1, wherein the controller is further capable of extracting characteristic data of the tracking area and the second area, and calculates a correlation value between the characteristic data of the extracted tracking area and the characteristic data of the extracted second area.

4. The eye tracking apparatus according to claim 1, wherein the controller is further capable of detecting a change between the tracking area and the second area, and the tracking area storing unit stores the second area as a tracking area when the controller detects a change.

5. An eye tracking apparatus for detecting an eye in a plurality of pieces of image data, which are obtained in chronological order by picking up images of a face, and tracking the detected eye, comprising:
threshold storing means for storing a threshold;
first identifying means for identifying a first area of an eye in a piece of image data;
tracking area storing means for storing the first area identified by the first identifying means as a tracking area;
second identifying means for identifying a second area of an eye in one of the pieces of image data subsequent to another of the pieces of image data obtained in chronological order, on the basis of the tracking area stored in the tracking area storing means;
calculating means for calculating a correlation value between the tracking area and the second area; and
comparing means for comparing the correlation value calculated by the calculating means with the threshold stored in the threshold storing means;
wherein the tracking area storing means stores the second area identified by the second identifying means as the tracking area when a comparison result by the comparing means indicates that the correlation value is larger than the threshold.

6. The eye tracking apparatus according to claim 5, wherein the second identifying means identifies the second area, which is near the tracking area, in the one of the pieces of image data subsequent to the another of the pieces of image data obtained in chronological order.

7. The eye tracking apparatus according to claim 5, further comprising extracting means for extracting characteristic data of the tracking area and the second area, wherein the calculating means calculates a correlation value between the characteristic data of the tracking area extracted by the extracting means and the characteristic data of the second area extracted by the extracting means.

8. The eye tracking apparatus according to claim 5, further comprising change detecting means for detecting a change between the tracking area and the second area, wherein the tracking area storing means stores the second area as a tracking area when the change detecting means detects a change.

9. An eye tracking method for detecting, with a computer, an eye in a plurality of pieces of image data, which are obtained in chronological order by picking up images of a face, and tracking the detected eye, the method comprising:
storing a threshold;
identifying a first area of an eye in a piece of image data;
storing the identified first area as a tracking area;
identifying a second area of an eye in one of the pieces of image data subsequent to another of the pieces of image data obtained in chronological order, on the basis of the tracking area;
calculating a correlation value between the tracking area and the second area;
comparing the calculated correlation value with the threshold; and
storing the second area as the tracking area when a comparison result indicates that the correlation value is larger than the threshold.

10. A computer memory product having computer readable program means for causing a computer to detect an eye in a plurality of pieces of image data, which are obtained in chronological order by picking up images of a face, and to track the detected eye, said program code means comprising:
program code means for causing the computer to store a threshold;
program code means for causing the computer to identify a first area of an eye in a piece of image data;
program code means for causing the computer to store the identified first area as a tracking area;
program code means for causing the computer to identify a second area of an eye in one of the pieces of image data subsequent to another of the pieces of image data obtained in chronological order, on the basis of the tracking area;
program code means for causing the computer to calculate a correlation value between the tracking area and the second area;
program code means for causing the computer to compare the calculated correlation value with the threshold; and
program code means for causing the computer to store the second area as the tracking area when a comparison result indicates that the correlation value is larger than the threshold.

11. An eye state judging apparatus for detecting an eye in image data obtained by picking up an image of a face and judging an open/close state of the detected eye, comprising a controller capable of performing operations of:
identifying an eye area in the image data;
detecting the shape of a lid in the identified eye area; and
judging an open/close state of the eye on the basis of the detected shape of the lid.

12. The eye state judging apparatus according to claim 11, wherein the controller is further capable of calculating a function which indicates the shape of the lid, and judges the open/close state of the eye on the basis of the calculated function.

13. An eye state judging apparatus for detecting an eye in image data obtained by picking up an image of a face and judging an open/close state of the detected eye, comprising:
identifying means for identifying an eye area in the image data;
lid detecting means for detecting the shape of a lid in the eye area identified by the identifying means; and
judging means for judging an open/close state of the eye on the basis of the shape of the lid detected by the lid detecting means.

14. The eye state judging apparatus according to claim 13, wherein the lid detecting means includes function calculating means for calculating a function which indicates the shape of the lid, and the judging means judges the open/close state of the eye on the basis of the function calculated by the function calculating means.

15. An eye state judging method for detecting, with a computer, an eye in image data obtained by picking up an image of a face and judging an open/close state of the detected eye, comprising steps of identifying an eye area in the image data;

detecting the shape of a lid in the identified eye area; and judging an open/close state of the eye on the basis of the detected shape of the lid.

16. A computer memory product having computer readable program code means for causing a computer to detect an eye in image data obtained by picking up an image of a face and to judge an open/close state of the detected eye, said program code means comprising:

program code means for causing the computer to identify an eye area in the image data;

program code means for causing the computer to detect the shape of a lid in the identified eye area; and program code means for causing the computer to judge an open/close state of the eye on the basis of the detected shape of the lid.

17. A method of detecting and tracking an eye in image data obtained from chronological images of a face, the method comprising:

identifying a first area of an eye as a tracking area;

identifying a second area of an eye in image data obtained subsequently to the stored tracking area according to the stored tracking area;

calculating a correlation value between the tracking area and second area; and storing the second area as the tracking area when the correlation value is larger than a stored threshold.

* * * * *